Aug. 27, 1963 W. L. BECKWITH, JR 3,101,642
STOP MECHANISM FOR BRAIDING MACHINES
Filed Dec. 17, 1962 4 Sheets-Sheet 1
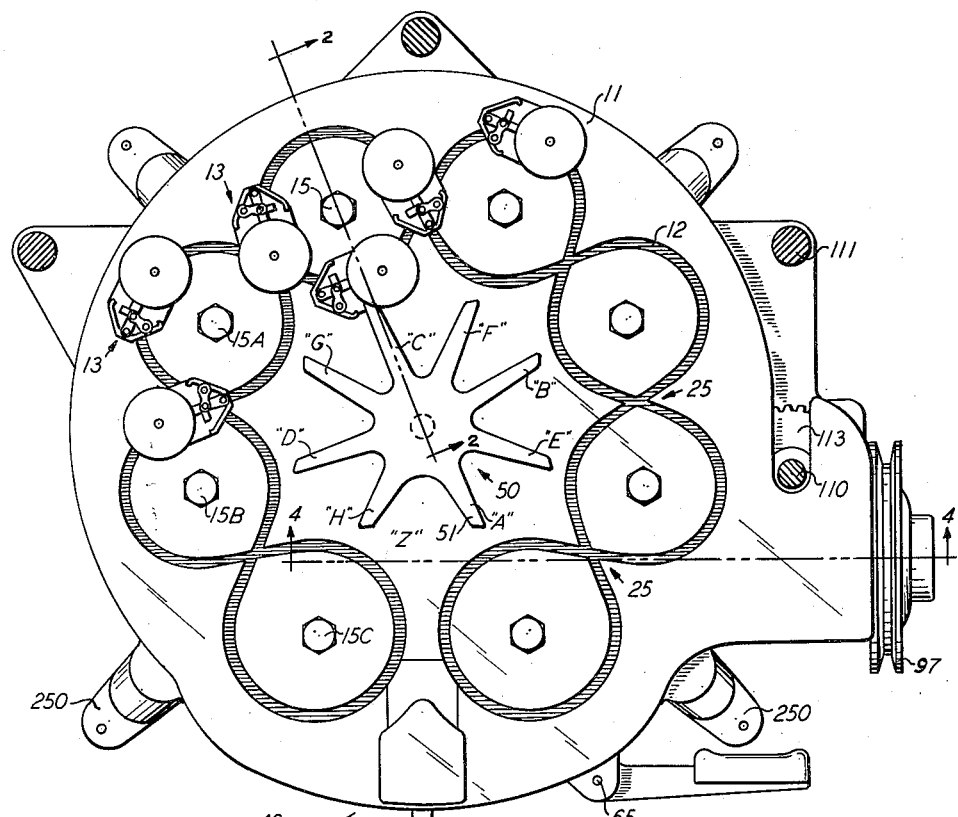
Fig 1
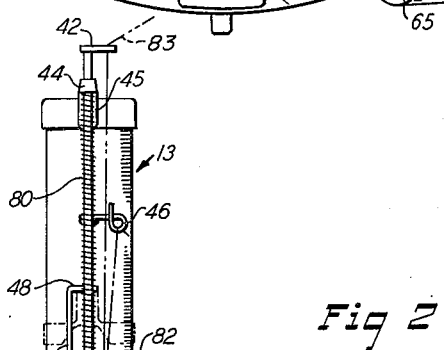
Fig 2
INVENTOR.
WALTER LEARNED BECKWITH, JR.
BY
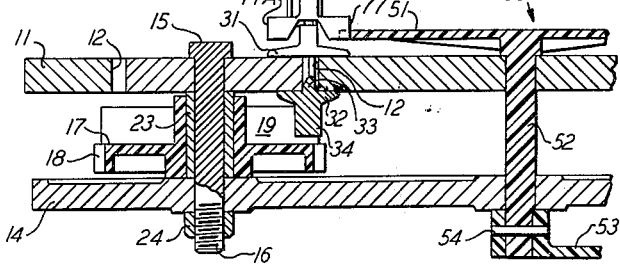
ATTORNEY Aug. 27, 1963   W. L. BECKWITH, JR   3,101,642
STOP MECHANISM FOR BRAIDING MACHINES
Filed Dec. 17, 1962   4 Sheets-Sheet 2
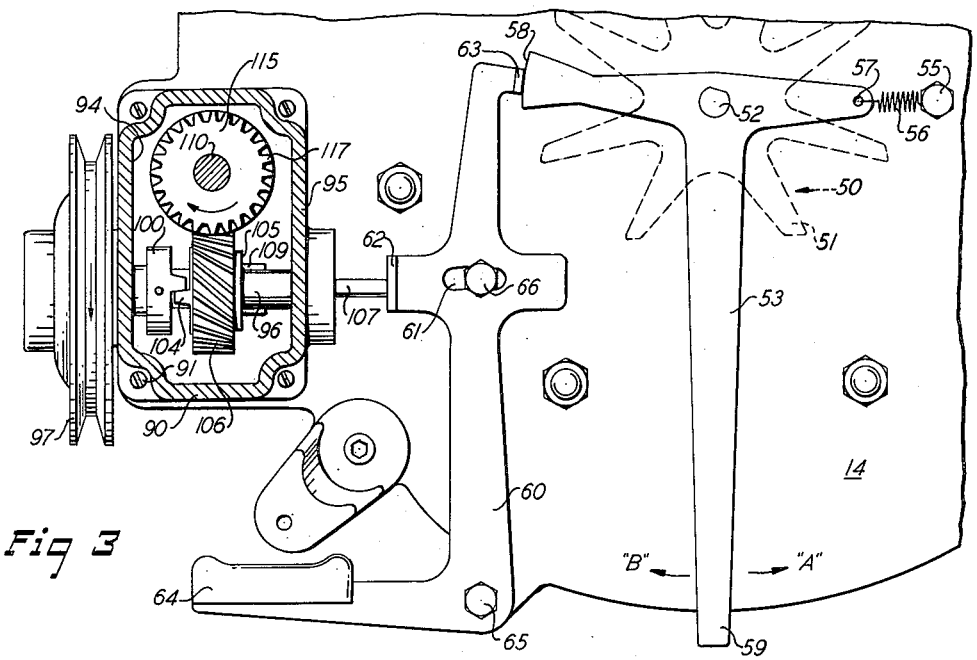
Fig 3
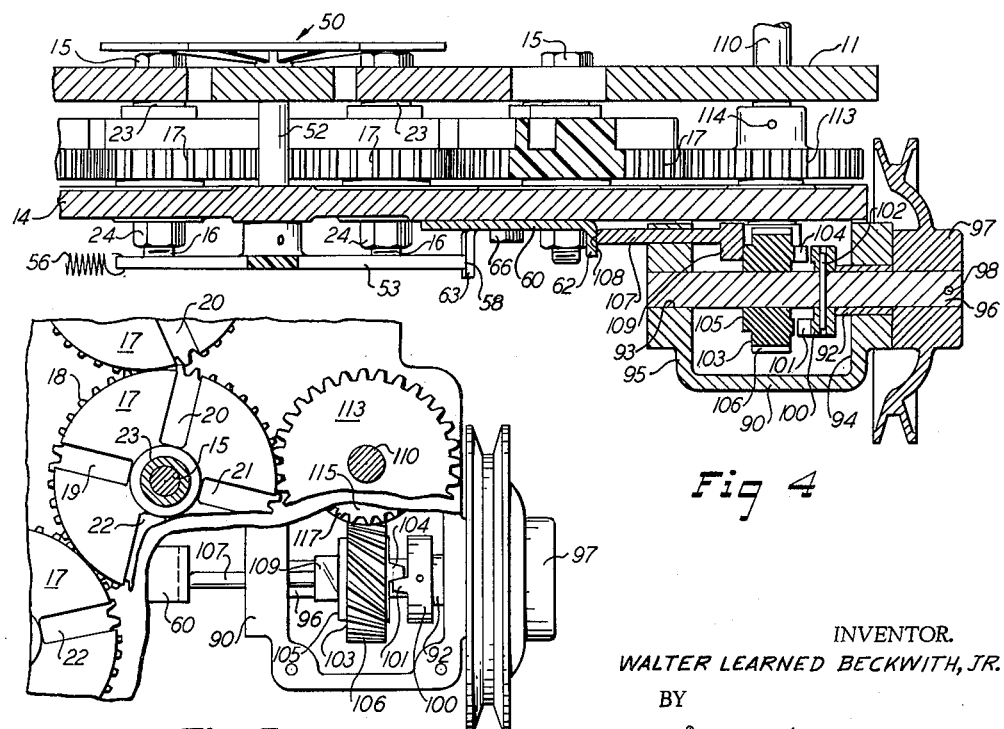
Fig 4
Fig 5
INVENTOR.
WALTER LEARNED BECKWITH, JR.
BY
William Frederick Werner
ATTORNEY Aug. 27, 1963 W. L. BECKWITH, JR 3,101,642
STOP MECHANISM FOR BRAIDING MACHINES
Filed Dec. 17, 1962 4 Sheets-Sheet 3
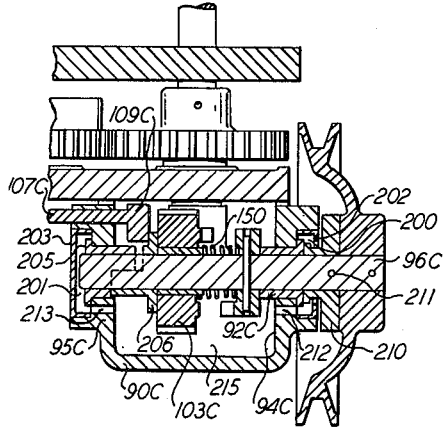
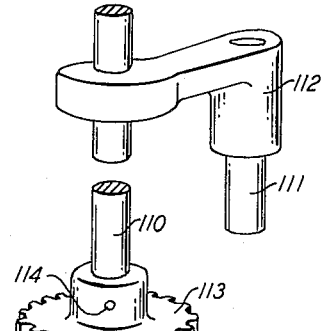
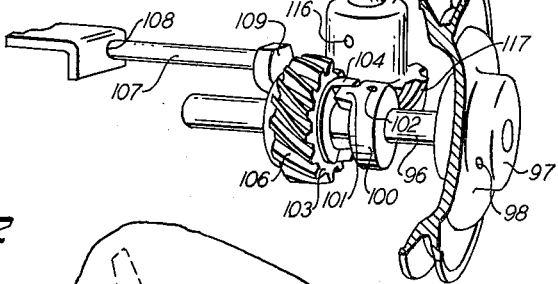
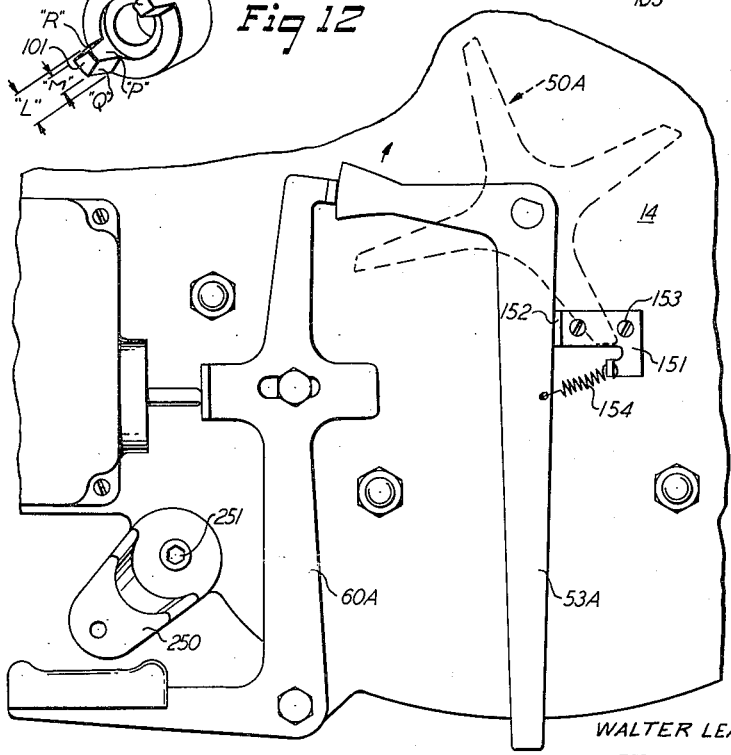
INVENTOR.
WALTER LEARNED BECKWITH, JR.
BY
William Frederick Werner
ATTORNEY Aug. 27, 1963  W. L. BECKWITH, JR  3,101,642
STOP MECHANISM FOR BRAIDING MACHINES
Filed Dec. 17, 1962  4 Sheets-Sheet 4
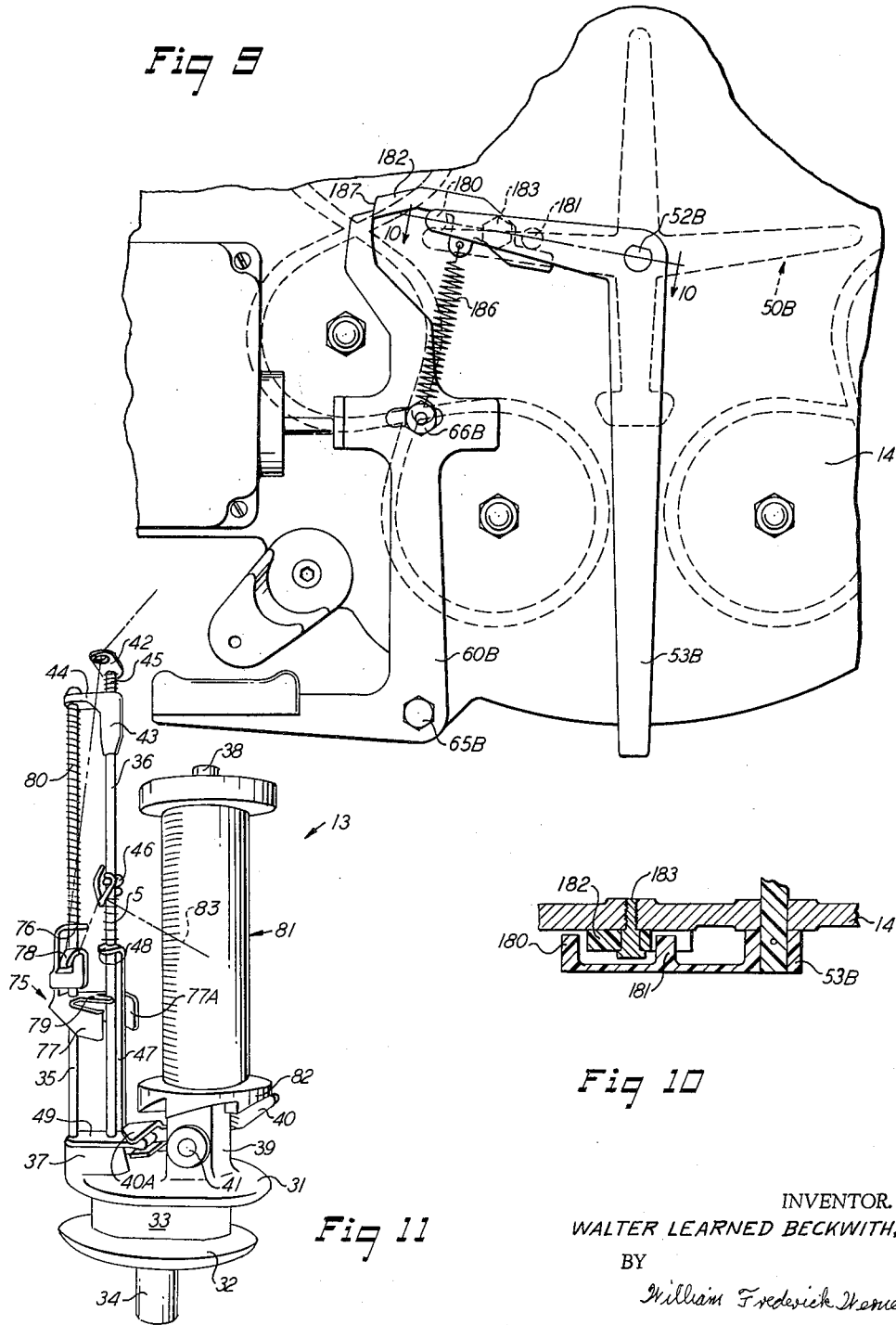
INVENTOR.
WALTER LEARNED BECKWITH, JR.
BY
William Frederick Werner.
ATTORNEY

United States Patent Office 3,101,642
Patented Aug. 27, 1963

3,101,642
STOP MECHANISM FOR BRAIDING MACHINES
Walter Learned Beckwith, Jr., Warwick, R.I., assignor to Plastic Mold & Engineering Co., East Providence, R.I., a corporation of Rhode Island
Filed Dec. 17, 1962, Ser. No. 245,244
6 Claims. (Cl. 87—18)

This invention relates to the stop mechanism of braiding machines and more particularly to the clutch and the mechanism under control of the supply thread which actuates the clutch to stop the braiding machine.

In one type of braiding machine there is provided a plurality of concentric circles of horn gears, with each gear in the outer circle intermeshing with a gear in the inner circle or with a gear in an intermediate circle which meshes with a gear in the inner circle. Two series of bobbin carrier units travel in two defined continuous tracks created by the horn gears. The tracks following approximately the pitch lines of the gears crossing each other at each point where the gears intermesh. This type of machine produces a tubular braid.

In the other type of braiding machine which produces a flat braid and the type illustrated in the present drawings, a top plate is provided with a serpentine track comprising a series of intermeshing circles. Beneath the top plate and on the centers of the circles, horn gears are mounted. Where the horn gears mesh, the circles cross or engage to provide a figure eight path alternating from the outside half of a circle to the inside half of the adjacent circle when traveling in one direction. When traveling in the reverse direction the path follows the opposite half of the half circles. A plurality of bobbin carrier units travel in the two defined continuous tracks impelled by the horn gears.

An object of the present invention is to provide a new and improved stop mechanism for all types of braiding machines, one which will throw the braiding machine out of operation upon the breakage or expansion of a thread.

In prior art stop mechanisms the clutch which stopped the machine was disengaged by means of a spring or by means of gravity. If the load transmitted by the clutch was increased it became increasingly difficult to disengage the clutch. There was also great wear on the bevel gears of the clutch. To overcome this great wear the gears were heavily greased and since the gear boxes were constructed with an open face, the gears threw grease on the braid. The present invention overcomes all of these undesirable conditions by providing a clutch wherein the spiral gears disengage by means of the gear thrust. Therefore, the greater the load carried by the clutch the easier the clutch disengages. The new clutch construction is housed in an enclosed housing where proper lubrication can be applied even though wear is reduced to a minimum by the new construction.

In the prior art flat belts were used to drive the pulleys used to rotate the braiding machine. Flat belts had to be used because it is customary to align banks of braiding machines back to back. The present clutch construction eliminates the inefficient flat belt by providing pulleys which can be driven with V belts which cannot be crossed, thus increasing the power driving efficiency of the braiding machines. The counter drive of one bank of braiding machines is accomplished by changing the hand of the spiral gear on the pulley shaft.

In prior art braiding machines the stop motion was initiated by a finger which was positioned at one given point in the machine. The braiding function continued tion until the thread carried arrived at the station of the stop motion finger. A rim with a plurality of fingers is used but it is not centrally pivoted but rather slides in an awkward inefficient motion. The present stop motion is initiated by a centrally pivoted star wheel or multiple finger wheel. Thus the bobbin carrier travels an extremely short distance upon thread breakage before the stop motion is actuated.

Other objects of the present invention will be pointed out in part and become apparent in part in the following specification and claims.

Referring to the drawings in which similar characters of reference refer to like parts:

FIGURE 1 is a plan view of the upper plate provided with the carrier track of a flat braiding machine provided with the new and improved stop mechanism.

FIGURE 2 is vertical cross sectional view taken on line 2—2 of FIGURE 1.

FIGURE 3 is a fragmentary bottom view of the lower plate illustrating the stop motion levers, the spiral gears and clutch.

FIGURE 4 is a vertical cross sectional view taken on line 4—4 of FIGURE 1.

FIGURE 5 is a fragmentary plan view through the machine at the clutch position with the top plate, lower plate and horn gears broken away for clarity.

FIGURE 6 is a view similar to FIGURE 4 showing the clutch disengaged.

FIGURE 7 is a fragmentary perspective view of the clutch mechanism.

FIGURE 8 is a view similar to FIGURE 3 showing a modified form of lever construction.

FIGURE 9 is another view similar to FIGURE 3 showing still another modified form of lever construction.

FIGURE 10 is a vertical cross sectional view taken on line 10—10 of FIGURE 9.

FIGURE 11 is a perspective view of a bobbin carrier.

FIGURE 12 is a perspective view of the clutch collar showing that the teeth taper in two directions.

Referring to the drawing, reference numeral 11 indicates the top plate of a braiding machine provided with the usual serpentine track 12 and thread carriers, generally indicated by reference numeral 13. A lower plate 14 is held in spaced relation to top plate 11 by means of a plurality of T shaped shafts 15, 15A, 15B, 15C, etc., having threaded ends 16. Conventional horn gears 17 are rotatively mounted upon T shaped shafts 15, 15A, 15B, etc. Horn gears 17 may be the same as the horn gear disclosed in U.S. Patent No. 2,941,440, dated June 21, 1960, Edward C. Scanlon, inventor. In either event the horn gears 17 are provided with gear teeth 18 and four slots 19, 20, 21 and 22. Each slot is located ninety degrees from the next adjacent slot. A bushing 23 may be provided in the center of horn gear 17 as a spacer. The bushing 23 is a bearing for rotatable engagement with the horn gear 17. A nut 24 rotatively engages threads 16 and bears against lower plate 14 to hold the top plate 11 and lower plate 14 in the spaced relation of bushing 23.

The horn gears 17 intermesh in a manner whereby slots 19 on different horn gears align or mate at the point 25 in the sepentine track 12 where the track crosses itself.

Thread carrier 13 may consist of the usual and well known construction commonly used in braiding machines or it may be constructed in accordance with U.S. Patent No. 2,960,905, dated November 22, 1960, Braiding Machine Bobbin Carrier, Edward C. Scanlon, inventor.

As illustrated the thread carrier 13, comprises a base having an upper flange 31 and a lower flange 32 with a web 33 connecting the upper 31 and lower 32 flanges for guiding and supporting the thread carrier 13 in the sinuous or serpentine path or track 12 in the upper plate 11 or raceway of the braiding machine. A stud 34 projects downwardly from lower flange 32 and is adapted to engage and be carried in slots 19 etc., of the horn gears 17. The horn gears 17 transferring the stud 34 from the slot of one horn gear to the slot of the adjacent horn gear at the junction or transfer point or cross over point 25 in the serpentine path 12. Two standards 35, 36 are secured in spaced relation in a boss 37 integrally formed in upper flange 31. A spindle 38 is fastened in a pad 39 integrally formed in upper flange 31. A pawl 40 is pivotally mounted on a pawl stud 41 fastened in pad 39. A top thread guide 42 is secured to standard 36. A bushing 43 slidingly mounted on standard 36 is provided with an arm 44 which engages standard 35. A coil spring 45 is interposed between top thread guide 42 and bushing 43 to yieldingly hold arm 44 against the top of standard 35. A pigtail thread guide 46 is adjustably secured to standard 36. A connecting link 47 provided with an upper ear 48 and a lower finger 49 is slidably mounted upon standard 36 by means of upper ear 48 and lower finger 49 which also engages to pivot end 40A of pawl 40. A coil spring 5 is interposed between pigtail thread guide 46 and upper ear 48 to yieldingly hold connecting link 47 and end 40A in a "down" position. A braider stop, generally indicated by reference numeral 75, comprises an upper bearing 76 and two spread apart legs 77, 77A. A thread holder 78 is fastened to braider stop 75. A guide finger 79 is formed intermediate spread apart legs 77, 77A. Braider stop 75 is slidably mounted upon standard 35 by means of upper bearing 76 and guide finger 79. A coil spring 80 is interposed between upper bearing 76 and arm 44 to yieldingly urge braider stop 75 downwardly. A braider spool, generally indicated at 81, is provided with teeth 82 and thread 83. Braider spool 81 is rotatively mounted upon spindle 38 with one of the teeth 82 in abutting engagement with pawl 40. Thread 83 as it comes off spool 81 passes through pigtail thread guide 46, thread holder 78 and top thread guide 42 to the braiding position on the machine (not shown). FIGURE 11 illustrates the component parts of thread carrier 13 in normal operating or braiding position.

In operation when the tension on thread 83 becomes sufficiently great braider stop 75 will be lifted upwardly through thread holder 78 and against the tension of coil spring 80, whereby guide finger 79 engaging upper ear 48 lifts connecting link 47 to pivot pawl 40 out of engagement with teeth 82 to permit braider spool 81 to rotate on spindle 38 to release thread off spool 81. In this manner the tension on thread 81 is released and braider stop drops downwardly under the influence of both gravity and coil spring 80. Connecting link 47 also drops downwardly under the influence of gravity and coil spring 5. Lower finger 49 will thereby pivot pawl 40 into engagement with one of the teeth 82 to prevent further rotation of spool 81.

Should the tension on thread 83 be released completely as when the thread breaks, then braider stop 75 and spread apart legs 77, 77A will be in "down" position with guide finger 79 resting upon lower finger 49, for purposes which will presently appear.

A disk provided with a plurality of radially projecting fingers, is generally indicated by reference numeral 50, and will be termed star wheel 50 having fingers 51. A shaft 52 is attached to or integrally forms part of star wheel 50. Shaft 52 is rotatively mounted in top plate 11 and lower plate 14. A clutch latch lever 53, T shaped, is fastened to shaft 52 by means of a dowel pin 54. A screw 55 is fastened in lower plate 14. A spring 56 is fastened on one end to screw 55 and on the other end to clutch latch lever 53 at 57 (see FIGURE 3). A radial surface 58 is provided on one end and a handle 59 on the other end of clutch latch lever 53.

A clutch lever 60 provided with an elongated slot 61, a side projection 62, an end projection 63 and a handle 64, is pivotally mounted to lower plate 14 by means of screws 65 and 66 with end projection 63 engaging radial surface 58.

A clutch housing 90 is fastened to lower plate 14 by means of screws 91. A bearing 92 is secured in wall 94 of clutch housing 90. A pulley shaft 96, having a V grooved pulley 97 secured thereto by means of a dowel pin 98, is rotatively mounted in a bearing 92, and in a bearing 93 formed in wall 95 of housing 90. A clutch collar 100 provided with a plurality of clutch drive teeth 101 is fastened to pulley shaft 96 by means of a dowel pin 102. A drive connecting spiral gear 103 provided with a plurality of driven clutch teeth 104, a rear side 105 and spiral teeth 106 is mounted to freely rotate on pulley shaft 96. A clutch rod 107 having opposite ends 108 and 109 is slidably mounted in wall 95 of housing 90.

A vertical shaft 110 (see FIGURES 1 and 7) or main drive shaft is rotatively mounted on the lower end in lower plate 14. A second vertical shaft 111 provided with a bracket 112 is fastened in lower plate 14. Vertical shaft 110 is rotatively mounted on the top end in bracket 112. In this manner vertical shaft 110 is easily assembled and held in sturdy, accurate vertical alignment. A spur gear 113 is fastened to vertical shaft 110 by means of dowel pin 114 and is adapted to engage and drive the horn gears 17. A driven spiral gear 115 secured to vertical shaft 110 by means of pin 116, is provided with spiral teeth 117 which are adapted to slidingly shift in relation to spiral teeth 106.

In operation, let it be assumed that the various parts of the braiding machine are in the positions shown in FIGURES 1, 2, 3, 4, 5, 7 and 11, wherein the function of braiding is being performed. A V belt (not shown) connected to a source of power, such as an electric motor (not shown), is connected to V grooved pulley 97 for continuous rotation.

Rotation of V grooved pulley 97 rotates pulley shaft 96 and clutch collar 100. Clutch drive teeth 101 in mating engagement with driven clutch teeth 104 rotates drive connecting spiral gear 103, and thru spiral teeth 106 engaging spiral teeth 117 rotation of driven spiral gear 115, vertical shaft 110, spur gear 113, horn gears 17 and the travel of the spool carriers 13 in track 12 is accomplished. The braiding function is thereby performed. The braiding function will continue until one of two events take place. One event is the manual operation of the stop motion. The other event is the automatic operation of the stop motion. The manual operation is the grasping of handle 59 to pivot clutch latch lever 53 upon shaft 52 to remove radial surface 58 from engagement with end projection 63. Handle 59 may be moved in either direction, as indicated by arrows "A" and "B."

The chain of events initiated by the disengagement of radial surface 58 from end projection 63 is exactly the same for both manual and automatic operation of clutch latch lever 53. The further function of the machine will now be described in relation to the initiation of the automatically operated stop motion.

With particular reference to FIGURES 1 and 11; the bobbin carriers 13 will travel the tortuous path of serpentine track 12 as the slots 19, 20, 21 or 22 of horn gears 17 rotate and transfer the studs 34 to the companion horn gear and mating slot.

Star wheel 50, in the form illustrated in FIGURE 1, is provided with eight fingers 51, four fingers A, B, C, D of which are for engagement by spread apart leg 77, when the bobbin carrier 13 is traveling in one direction and four fingers E, F, G and H are for engagement by spread apart leg 77A when the bobbin carrier 13 is traveling in the opposite direction. It will be noted that the fingers engageable by the bobbin carrier traveling in one direction alternate with the fingers engageable by the bobbin carrier 13 traveling in the opposite direction.

Upon the breaking of a thread 83, spring 80 and the force of gravity will cause braider stop 75 to drop down until guide finger 79 rests upon lower finger 49. In this position spread apart leg 77 or 77A is in position to engage one of the fingers 51 to rotate star wheel 50 and through shaft 52, clutch latch lever 53 is rotated to pivotally disengage radial surface 58 from end projection 63.

One of the novel features of the present mechanism will now be described.

It will be observed, that the horn gears 17 perform the work of moving the bobbin carriers 13 through track 12 and that the many horn gears 17 in and of themselves plus the work they perform provide a heavy load for spur gear 113, shaft 110 and helical or spiral gear 115.

The angle of the helix or spiral of teeth 106 is such that in mating with helical teeth 117 the teeth 106 work to separate from teeth 117 because of the load carried by teeth 117. In an effort for teeth 106 to rotate teeth 117 the torque of shaft 110 tends to cause spiral gear 103 to slide along pulley shaft 96. However, clutch rod 107 would limit the sliding movement of spiral gear 103 so that teeth 104 may disengage teeth 101 but spiral teeth 106 do not disengage spiral teeth 117.

When clutch latch lever 53 is in the position whereby radial face 58 abutts end projection 63, then side projection 62 engages and forces clutch rod 107 and end 109 thereof against rear side 105 of helical gear 103, whereby teeth 106 are held in engagement with teeth 117 and pulley 97 through pulley shaft 96 and clutch collar 100 rotates vertical shaft 110. Clutch drive teeth 101 are obviously in engagement with driven clutch teeth 104. As soon as radial surface 58 disengages end projection 63, the load on teeth 117 cause teeth 106 to tend to slide in relation to each other, whereby spiral gear 103 slides along pulley shaft 96 pushing clutch rod 107 against side projection 62 to pivot clutch lever 60 around screw 65. With the disengagement of teeth 104 from 101 shaft 110 ceases to rotate while pulley shaft 96 idly rotates. After the broken thread 83 is repaired, handle 64 is manually operated to pivot clutch lever 60 into operative position with side projection 62 forcing clutch rod 107 against rear side 105 and teeth 104 into engagement with teeth 101. End projection 63 abutts radial surface 58. It has been found that the efficient disengagement of clutch drive teeth 101 with driven clutch teeth 104 requires that the teeth have tapered mating surfaces.

FIGURE 12 clearly illustrates teeth 101 tapered in two directions. The base dimension "L" is wider than front dimension "M" to provide a taper wherein the root of the tooth is wider than the front end of the tooth on the outside surface "N" of the tooth.

The inside surface "P" is narrower than outside surface "N" thereby causing faces "Q" and "R" of tooth 101 to taper inwardly.

The teeth 104 on spiral gear 103 have faces which are tapered to matingly engage the faces "Q" and "R" on teeth 101.

FIGURE 6 illustrates clutch drive teeth 101 disengaged from driven clutch teeth 104, the condition prevailing when end projection 63 is disengaged from radial surface 58. A spring 150 is shown around pulley shaft 96 and interposed between clutch collar 100 and helical gear 103. Spring 150 is of very low force and is provided to insure that clutch collar 100 stays separated from helical gear 103 so that teeth 101 do not rotatively bang against teeth 104 to create unnecessary wear and noise. Spring 150 is not essential to the operation of clutch collar 100 and helical gear 103.

FIGURE 8 illustrates a modified form of star wheel 50A provided with four fingers which correspond to either group A, B, C, and D or group E, F, G and H of FIGURE 3. In either event only one of the two spread apart legs 77 or 77A will engage the fingers and then the engagement can only take place in one direction of travel of bobbin carriers 13. A stop 151 provided with a projection 152 is fastened to lower plate 14 by means of screws 153. A spring 154 attached on one end to clutch latch lever 53A and on the other end to stop 151, yieldingly holds clutch latch lever 53A against projection 152. Clutch latch lever 53A rotates in the direction of the arrow to disengage clutch lever 60A which corresponds to clutch lever 60 in construction and function.

FIGURES 9 and 10 illustrate still another modified form of star wheel 50B and clutch latch lever 53B. Star wheel 50B is provided with an enlarged end 175 on one finger to compensate for the distance between the opposite ends of the serpentine track 12 in a braiding machine which makes flat braid. The position mentioned is indicated by the letter "Z" in FIGURE 1.

Clutch latch lever 53B fastened to shaft 52B is provided with two upright projections 180 and 181. A clutch latch 182 is pivotally mounted upon a stud 183 secured in lower plate 14. Clutch lever 60B is pivotally mounted upon screw 65B. A spring 186 is fastened on one end to clutch latch 182 and on the other end to screw 66B. Clutch latch lever 53B may be pivoted clockwise or counterclockwise. In one direction upright projection 181 engages clutch latch 182 to pivot end 187 out of engagement with the end of clutch lever 60B. In the opposite direction clutch latch lever 53B and upright projection 180 engage clutch latch 182 to pivot end 187 out of engagement with the end of clutch lever 60B. Spring 186 yieldingly holds clutch latch 182 against both upright projections 180 and 181 to align end 187 with the end of clutch lever 60B.

The four fingered star wheel 50B functions in the same manner as that described for star wheel 50A.

With further reference to FIGURE 6, wherein a modified form of clutch housing 90C is provided; there is illustrated chambers 200 and 201 provided in side walls 94C and 95C, respectively. Caps 202 and 203 are press fitted into chambers 200 and 201, respectively. A thust bearing half 205 is mounted in wall 95C. The other half 206 of the thrust bearing is slidably mounted upon pulley shaft 96C. The thrust bearing is in two halves to permit the two halves to telescope when helical gear 103C slides upon pulley shaft 96C. The end 109C of clutch rod 107C bears against one half 206 of the thrust bearing and through said thrust bearing clutch rod 107C holding helical gear 103C into engagement with the mating helical gear. A collar 210 is fastened to the end of pulley shaft 96C by means of a drive fit and a pin 211. In this manner chambers 200 and 201 become catch basins for oil which might run along pulley shaft 96C and between bearing 92C on one end and thrust bearing 205 on the other end. A lube hole 212 in side wall 94C and a lube hole 213 in side wall 95C allow oil in chambers 200 and 201, respectively, to flow into chamber 215 formed in clutch housing 90C.

Feet 250 attached to lower plate 14 by means of screws 251 support lower plate 14 at a desired position above a supporting medium such as a floor, bench or table.

Having shown and described preferred embodiments of the present invention by way of example, it should be realized that structural changes could be made and other examples given without departing from either the spirit or scope of this invention.

What I claim is:

1. A braiding machine having a clutch mechanism consisting of a pulley shaft provided with a drive pulley, a clutch collar, provided with a drive tooth, fastened to said pulley shaft, a drive connecting spiral gear, provided with a plurality of spiral teeth and a driven clutch tooth, freely mounted on said pulley shaft, a main drive shaft, a driven spiral gear provided with a plurality of spiral teeth, means securing said driven spiral gear to said main drive shaft, means attaching a torque work load to said main drive shaft, a clutch rod, means forcing said clutch rod into engagement with said drive connecting spiral gear, whereby said driven clutch tooth engages said drive tooth and the plurality of spiral teeth on said drive connecting spiral gear engage the plurality of spiral teeth on said driven spiral gear, and means releasing said means forcing said clutch rod into engagement with said drive connecting spiral gear, whereby said torque work load through the angle of the "helices" of said plurality of spiral teeth allows relative sliding movement of said drive connecting spiral gear on said pulley shaft with said driven spiral gear and disengagement of said drive clutch tooth from engagement with said driven clutch tooth.

2. A braiding machine having a clutch mechanism consisting of a pulley shaft provided with a drive pulley, a clutch collar, provided with a drive tooth, fastened to said pulley shaft, a drive connecting spiral gear, provided with a plurality of spiral teeth and a driven clutch tooth, freely mounted on said pulley shaft, a main drive shaft, a driven spiral gear provided with a plurality of spiral teeth, means securing said driven spiral gear to said main drive shaft, means attaching a torque work load to said main drive shaft, a clutch rod, a clutch lever, means pivotally mounting said clutch lever for engagement with said clutch rod to move said clutch rod toward said drive connecting gear, a clutch latch lever, means pivotally mounting said clutch latch lever for movement into and out of engagement with said clutch lever to lock and unlock said clutch lever in selected position with relation to said clutch rod engaging said drive connecting spiral gear, whereby said driven clutch tooth engages said drive tooth, and the plurality of spiral teeth on said drive connecting spiral gear engage the plurality of spiral teeth on said driven spiral gear, in locked position, and in unlocked position the torque work load through the angle of the hellices of said plurality of spiral teeth initiates relative sliding movement on said pulley shaft of said drive connecting spiral gear with said driven spiral gear and disengagement of said drive clutch tooth from engagement with said driven clutch tooth, whereby said drive connecting spiral gear through said clutch rod pivots said clutch lever into position to be engaged by said clutch latch lever for the movement of said clutch rod toward said drive connecting spiral gear, and locked position of said clutch latch lever.

3. A braiding machine having in combination a traveling thread carrier provided with a braider stop, a star wheel, a clutch latch lever, means pivotally connecting said star wheel to said clutch latch lever, said braider stop engageable with said star wheel, a clutch lever, means pivotally mounting said clutch lever for engagement with said clutch latch lever, a clutch mechanism consisting of a pulley shaft, a rotating pulley fastened to said pulley shaft, a clutch collar, provided with drive teeth, fastened to said pulley shaft, a drive connecting spiral gear, having spiral teeth and driven clutch teeth, freely mounted on said pulley shaft with said driven clutch teeth engageable and disengageable with said drive teeth, a clutch rod, said clutch lever abutting said clutch rod to hold said clutch rod against said drive connecting spiral gear whereby said driven clutch teeth engage said drive teeth, a main drive shaft, a driven spiral gear having spiral teeth, fastened to said main drive shaft, said drive connecting spiral gear having relative sliding movement with said driven spiral gear, the angle of the helix of the spiral teeth on said driven spiral teeth forcefully initiating the sliding movement of the drive connecting spiral gear on said pulley shaft.

4. A braiding machine comprising a lower plate and an upper plate having a continuous sinuous path, a plurality of shafts, a plurality of horn gears, one for each of said plurality of shafts, means on said shafts for holding said lower plate and upper plate in spaced relation in cooperation with said horn gears interposed between said lower plate and said upper plate, a plurality of thread carriers, a braider stop on each carrier under control of the carrier thread, means on said thread carriers to engage both said horn gears and said sinuous path, whereby through rotation of said horn gears, said thread carriers travel in said sinuous path, a star wheel provided with a plurality of fingers, a shaft, means fastening said star wheel to said shaft whereby said braider stop upon the breakage of a thread engages a finger on said star wheel to rotate said shaft, a clutch latch lever fastened to said shaft, a clutch lever pivotally mounted to said lower plate for engagement and disengagement with said clutch latch lever, a main drive shaft provided with means for rotating said horn gears, a pulley shaft provided with a drive pulley, a clutch mechanism interposed between said pulley shaft and said main drive shaft whereby said drive pulley through said clutch mechanism drives said main drive shaft, and means under control of said clutch lever for initiating the drive condition of said clutch mechanism, and said braider stop, through said star wheel, clutch latch lever and clutch lever initiates disengagement of said clutch mechanism.

5. A braiding machine having in combination a thread carrier provided with a vertically mounted braider stop having a spring to oppose upward movement thereof, and a thread holding said braider stop in upward position against the tension of said spring, means including horn gears and a tortuous path for rotating said thread carrier in a work cycle, a star wheel having a plurality of fingers, a clutch latch lever provided with two oppositely located projections, a shaft fastened on one end to said star wheel and on the other end to said clutch latch lever, a clutch latch, means pivotally mounting said clutch latch between said two oppositely located projections to limit pivotal movement, spring means normally holding holding said clutch latch against said two oppositely located projections, a clutch lever, means pivotally mounting said clutch lever with one end of said clutch lever abutting said clutch latch, a clutch-mechanism consisting of a pulley shaft, a V grooved pulley fastened to said pulley shaft, a clutch collar provided with a plurality of tapered drive teeth having inclined faces, means fastening said clutch collar to said pulley shaft, a drive connecting spiral gear having a plurality of spiral teeth and a plurality of tapered driven teeth having inclined faces which matingly engage and disengage said tapered drive teeth, said inclined faces and said tapered drive teeth tending to force disengagement of said drive and driven teeth, said drive connecting spiral gear being freely and slidably mounted upon said pulley shaft, a clutch rod, said clutch lever through said clutch latch abutting said clutch rod to hold said clutch rod against said drive connecting spiral gear, whereby said plurality of tapered driven teeth matingly engage said plurality of tapered drive teeth, a vertical main drive shaft, a driven spiral gear having a plurality of spiral teeth, means fastening said driven spiral gear to said vertical main drive shaft, a spur gear fastened to said main drive shaft engageable with said horn gears to rotate said horn gears, said drive connecting spiral gear having relative sliding movement in relation to said driven spiral gear, the angle of the helices of said plurality of spiral teeth on said driven spiral gear initiating the relative movement with the plurality of spiral teeth on said drive connecting spiral gear, whereby upon thread breakage said braider stop engages and rotates a finger on said star wheel to pivot said clutch latch lever and thereby said clutch latch out of engagement with said clutch lever to permit said drive connecting spiral gear to slide on said pulley shaft to move said clutch rod for relative movement of said plurality of spiral teeth on said drive connecting spiral gear and for disengagement of said plurality of tapered driven teeth on said drive connecting spiral gear from engagement with said plurality of tapered drive teeth on said clutch collar.

6. A braiding machine having in combination a lower plate, an upper plate having a closed continuous tortuous track, a plurality of shafts fastened on one end on said upper plate and on the other end to said lower plate, a plurality of interconnected horn gears individually mounted on said plurality of shafts between said upper plate and lower plate, a plurality of thread carriers, each thread carrier having a vertically mounted braider stop provided with two spread apart legs and a spring to oppose upward movement thereof, a spool of thread carried by said thread carrier, the thread in normal operating condition holding said braider stop in upward position against the forces of gravity and the force of said spring, means on said thread carriers to engage both said continuous tortuous track and said horn gears, whereby through rotation of said horn gears said thread carriers travel in said continuous tortuous track, a star wheel, a shaft rotatively mounted in said lower and said upper plate, means fastening said star wheel to said shaft in the geometrical center of said continuous tortuous path, said star wheel having a plurality of fingers sufficient in number to be alternately engaged by one of said two spread apart legs, upon thread breakage on alternate thread carriers traveling in opposite directions, a clutch latch lever having a handle and a radial surface, means fastening said clutch latch lever to said shaft, resilient means yieldingly holding said clutch latch lever in preselected position, a clutch lever provided with a handle, an elongated slot, a side projection and an end projection adapted to engage said radial surface, means pivotally mounting said clutch lever to said lower plate, said handle providing means for manually pivoting said clutch lever into selected position, a clutch housing, means fastening said clutch housing to said lower plate in fluid tight relationship, said clutch housing including opposite walls, a chamber in one of said opposite walls, a second chamber in the other of said opposite walls, one half of a thrust bearing secured in one of said opposite walls, a bearing secured in the other of said opposite walls, a pulley shaft provided with a V grooved pulley, rotatively mounted in said half of a thrust bearing and in said bearing, a clutch collar provided with two tapered drive teeth having opposite faces thereof inclined to the center of said pulley shaft, means fastening said clutch collar to said pulley shaft, a drive connecting spiral gear having a plurality of spiral teeth and two tapered driven teeth having opposite faces thereof inclined toward the center of said pulley shaft, slidably mounted upon said pulley shaft, said two tapered driven teeth adapted to matingly engage and disengage said two tapered drive teeth, the second half of the thrust bearing being slidingly mounted upon said pulley shaft with the second half of the thrust bearing adapted to slidingly engage the first half of the thrust bearing, means securing said drive connecting spiral gear to the second half of said thrust bearing, a clutch rod slidingly mounted in one of said opposite walls with one end engaging said side projection and the other end engaging the second half of said thrust bearing, a cap secured in said first mentioned chamber, and a second cap secured in said second mentioned chamber, said clutch housing having a main chamber, a lube orifice connecting said first mentioned chamber with said main chamber, a second lube orifice connecting said second mentioned chamber with said main chamber, a vertical shaft secured on one end in said lower plate, a spur gear fastened to said vertical shaft in drive connection with said horn gears, and a driven spiral gear, having a plurality of spiral teeth, fastened to said vertical shaft, said drive connecting spiral gear plurality of spiral teeth slidably engageable with the plurality of spiral teeth of said driven spiral gear, the angle of the helices of said plurality of spiral teeth on said driven spiral gear forcefully urging the plurality of spiral teeth on said drive connecting spiral gear to slide on said pulley shaft against the force of said clutch rod, when upon thread breakage rotation of said star wheel removes the force holding said clutch rod against said second half of the thrust bearing, said drive connecting spiral gear slides on said pulley shaft to disengage said two tapered drive teeth from said two tapered driven teeth.

References Cited in the file of this patent

UNITED STATES PATENTS

| | | |
|---|---|---|
| 1,008,504 | Wardwell | Nov. 14, 1911 |
| 1,805,498 | Rodgers et al. | May 19, 1931 |
| 2,099,933 | Janssen | Nov. 23, 1937 |
| 2,186,100 | Doering | Jan. 9, 1960 |